2,383,690

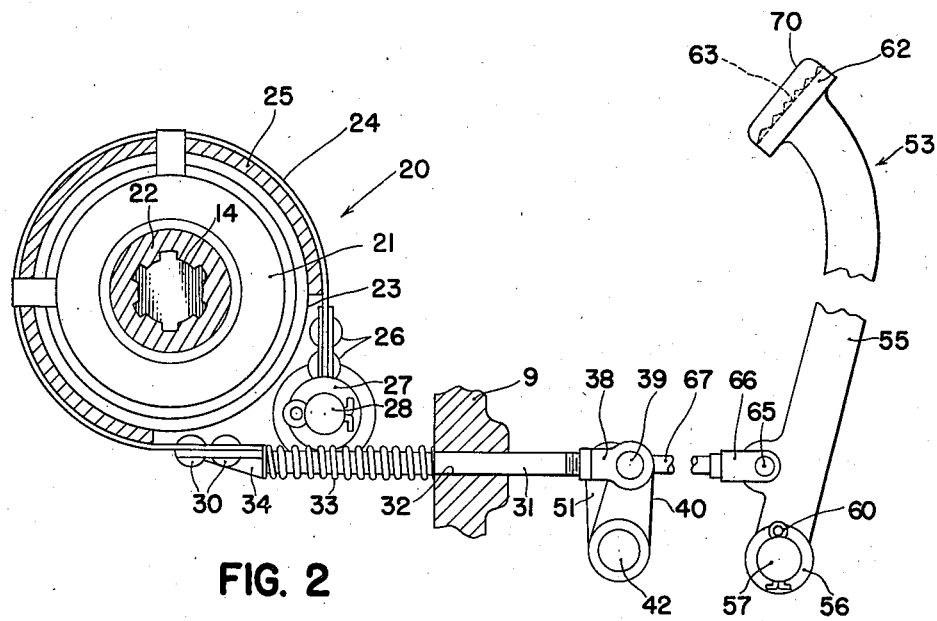
FIG. 2
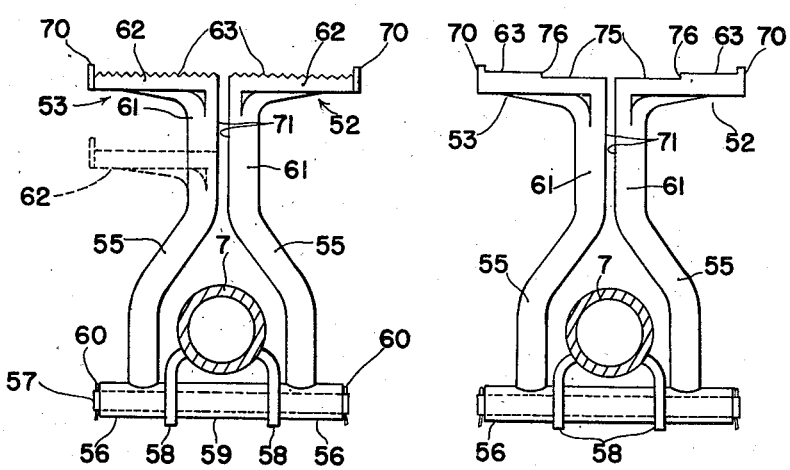
FIG. 3
FIG. 4
INVENTOR.
MAX SKLOVSKY
WILLARD H. NORDENSON Patented Aug. 28, 1945

UNITED STATES PATENT OFFICE 2,383,690

FOOT CONTROL PEDALS

Max Sklovsky, Moline, and Willard H. Nordenson, Rock Island, Ill., assignors to Deere & Company, Moline, Ill., a corporation of Illinois Application March 10, 1943, Serial No. 478,718

6 Claims. (Cl. 188—16)

The present invention relates generally to foot control pedals and more particularly to pedals adapted to be used in pairs, either simultaneously or independently at the option of the operator, such as, for example, used for controlling the two independent brakes on the rear wheels of a row crop tractor or the like and commonly known as differential brakes. The purpose of such brakes on a tractor or the like is to permit the inside rear wheel to be braked during a sharp turn, and thereby facilitating sharp turns at the ends of crop rows for various operations such as cultivating. Heretofore, it has been customary to provide a brake and brake pedal at each side of the tractor, which can be operated with the right or left foot when making a sharp turn. It has also been more or less conventional practice to supply tractors with hand operated clutches, thereby leaving the feet free for operating the differential brakes. Until recently, however, tractors were very seldom designed for speeds high enough to require brakes for merely stopping the tractor, but recently, tractors of higher speed have been introduced, making it advisable to provide brakes which can be conveniently applied simultaneously to both of the rear tractor wheels. It is therefore, one of the principal objects of the present invention to provide means for conveniently controlling a pair of differential brakes either independently or simultaneously at will.

More specifically, it is an object of the present invention to provide a pair of brake control pedals, which can be easily controlled, either independently or simultaneously, by one foot of the operator, leaving his other foot free to operate a clutch control pedal or the like. It is sometimes desirable to control the tractor from a standing position, in which it is necessary to stand on one foot and operate the two control pedals with the other foot.

It is still another object of the present invention to provide a pair of brake pedals disposed side by side for independent or simultaneous operation, but in which there is no danger of the operator catching his foot under one pedal when applying the brake with the other pedal.

Still another object of our invention relates to the provision of a pair of juxtaposed brake pedals having guide means to retain the operator's foot either when operating one of the pedals independently or operating both pedals simultaneously.

This application is a continuation-in-part of an application, Serial No. 172,906, filed November 5, 1937, by Maxon, Sklovsky and Nordenson, now Patent No. 2,345,351, dated March 28, 1944.

These and other objects and advantages of our invention will be apparent to those skilled in the art after a consideration of the following description, in which reference is had to the drawings appended hereto, in which Figure 1 is a fragmentary plan view of the rear end of a tractor, showing a pair of differential brakes constructed according to the principles of the present invention;

Figure 2 is a side elevational view of the brake mechanism as viewed substantially along a line 2—2 in Figure 1 but with the non-essential details of the tractor omitted;

Figure 3 is a front elevational view of the two pedals taken along a line 3—3 in Figure 1; and Figure 4 is a front elevational view showing a slight modification of the brake pedal construction.

Figure 1:
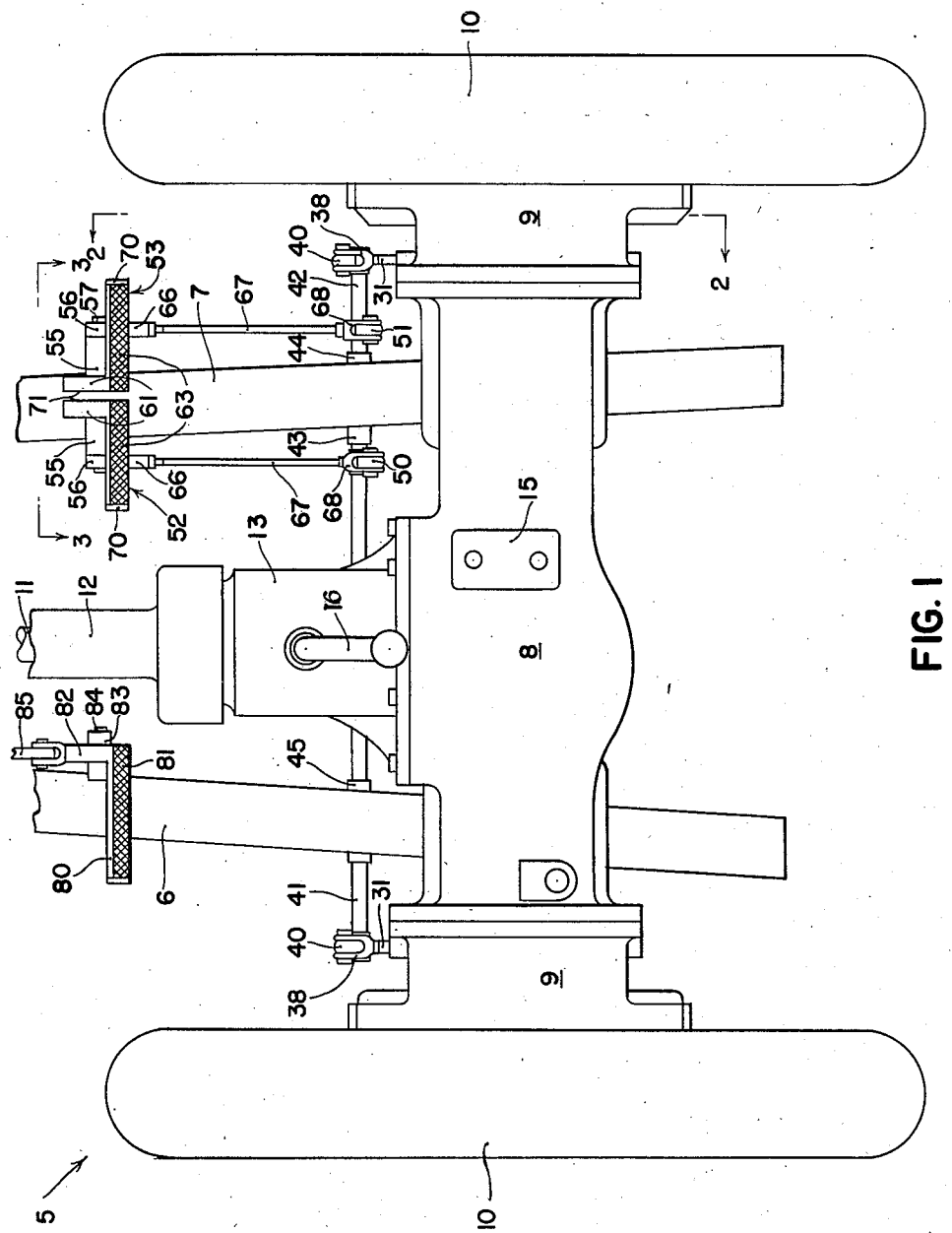

Referring now to the drawings, the tractor is indicated in general by reference numeral 5 and comprises a pair of longitudinally extending laterally spaced tubular frame members 6, 7, connected adjacent their rear ends to a transversely disposed banjo type rear axle housing 8. A pair of final drive housings 9 are secured at opposite ends, respectively, of the rear axle housing 8, which are supported on a pair of laterally spaced rear traction wheels 10, respectively.

Power is transmitted from the tractor engine through a longitudinally extending transmission shaft 11 disposed within a casing 12 to a transmission housing 13 secured to the front side of the rear axle housing 8. The transmission housing 13 contains a set of change speed gears controlled by a gear shift lever 16, from which power is distributed through a suitable differential gear mechanism (not shown) to a pair of transverse axle shafts within the axle housing, one of which is indicated by reference numeral 14 in Figure 2. Reference numeral 15 indicates a boss on top of the rear axle housing 8, to which the operator's seat is bolted. These and further details of construction and description of the tractor can be found by reference to the above-mentioned copending application, of which the present application is a continuation-in-part.

A pair of brake mechanisms, indicated generally by reference numeral 20, one of which is shown in Figure 2, are provided in the final drive housings 9, respectively, and are secured adjacent the outer ends of the drive axles 14, which drive the traction wheels 10. Each of the brake mechanisms comprises a brake drum 21 which is supported on a splined hub 22 engaging the splined end of the shaft 14. The splined hub 22 also serves as a coupling between the shaft 14 and a stub shaft (not shown) as described in the parent application. The brake drum 21 is provided with a cylindrical braking rim surface 23, around which is wrapped a brake band 24 having a suitable frictional lining 25, as is well-known to those skilled in the art. One end of the brake band is secured by rivets 26 to a bushing member 27 anchored to a stud 28 which is suitably fixed within the final drive housing 9. The opposite end of the brake band 24 is secured by rivets 30 to an operating rod 31, which extends forwardly through an aperture 32 in the front wall of the final drive housing 9. A compression spring 33 encircles the rod 31 and bears against an end fitting 34 to which the brake band is riveted, reacting against the inside of the front wall of the final drive housing 9. The force of the spring 33 tends to release the brake band 24, to relieve brake pressure when the operator releases his pressure on the brake.

The forward end of each of the brake rods 31 is provided with a bifurcated clevis 38, which is connected by a pin 39 to a lever arm 40. The two lever arms 40 are rigidly secured to a pair of transverse rockshafts 41, 42 disposed beneath the frame members 6, 7 of the tractor in axially aligned arrangement. The adjacent ends of the rockshafts 41, 42 are supported in a pair of journal bearings 43, 44, fixed beneath the tractor frame member 7, the rockshaft 41 extending beneath the transmission housing 13 and carried in a journal bearing 45 beneath the opposite tractor frame member 6. A pair of generally vertical actuating arms 50, 51 are fixed adjacent the inner ends of the rockshafts 41, 42, respectively.

The arms 50, 51 are operated by a pair of foot pedals 52, 53, respectively. The pedals 52, 53 comprise a pair of generally vertically disposed shanks 55, rigidly fixed as by welding to a pair of tubular supporting hubs 56. The hubs 56 are swingably supported in coaxial arrangement on a transverse supporting pin 57, which is carried in a pair of depending brackets 58 rigidly supported as by welding on the tractor frame member 7. A tubular spacing member 59 is disposed on the pin 57 between the two brackets 58 as shown in Figure 3. The pin 57 is prevented from axial movement by cotter pins 60 at opposite ends thereof, respectively. The two shanks 55 extend upwardly from the supporting hubs 56 on opposite sides of the frame member 7 and converge above the latter, having upper portions 61 disposed closely adjacent each other. A pair of actuating bars 62 are supported on the upper ends of the juxtaposed portion 61 of the shanks 55, extend laterally outwardly therefrom and are provided with knurled foot-receiving surfaces 63. Each of the pedal shanks 55 is connected through a pin 65 to a clevis 66, secured on the forward end of a control rod 67, the rear end of which is connected through a clevis 68 to the associated rockshaft actuating arm 50, 51. The outer end of each of the pedal bars 62 is provided with an upwardly projecting guide lip 70, which prevents the operator's foot from sliding off the pedal at one side thereof.

It will be noted that each of the foot-receiving surfaces 63 are sufficiently wide to receive one of the operator's feet, so that with the foot against the guide 70, either pedal may be pressed downwardly independently to a position such as is indicated in dotted lines in Figure 3, or the operator may place his foot in a centrally located position overlapping both foot-receiving surfaces 63, for actuating both pedals simultaneously. Normally, the two foot-receiving surfaces 63 are disposed substantially in the same plane, so that for simultaneous operation, they are in effect, a single brake pedal. Obviously, it is desirable to maintain the adjustments of the two brakes substantially uniform, so that a uniform braking action will be obtained upon the two brake drums by a simultaneous actuation of the two pedals to the same extent of movement. This adjustment can be made by any known method, such as by screwing the clevises 38, 66 and 68 axially along the rods 31 and 67, respectively.

One of the important features of the present invention resides in the juxtaposed arrangement of the two upper portions 61 of the pedal shanks and their relation to the foot operating surfaces 63. It will be noted that the inner edges of the latter are flush with the inner faces 71 of the juxtaposed shank portions 61 and the shanks extend generally perpendicular to the pedal surfaces 63, in the direction of movement of the pedals and are coextensive with a major portion of the inner edges. As a result of this arrangement, when the operator has depressed one of the pedals, as to the dotted line position shown in Figure 3, there are no projections on the opposite pedal under which the sole or toe of the operator's shoe can catch when he releases pressure on the brake. Obviously, if the pedal shanks 55 extended straight up from the hubs 56 to the center or outer portions of the pedal bars 62, there would be a constant hazard presented of the sole of the operator's shoe catching under the inner edge of the pedal whenever either of the brakes was actuated independently. With the present arrangement, however, each of the inner surfaces 71 of the shanks serves as an inner guide for the operator's foot when actuating the opposite pedal. Thus, the operator's foot is held during independent operation, between the outer guide 70 of the pedal being actuated, and the guide surface 71 on the opposite pedal. Since the latter surface is made reasonably smooth, the sole of the operator's shoe can slide freely along the guide surface 71.

In the embodiment shown in Figure 3, the outer guide lips 70 serve to prevent the operator's foot from sliding entirely off the pedals during simultaneous operation, but the knurled surface is relied upon to hold the foot in a substantially central position. In the embodiment shown in Figure 4, however, the inner portion of each of the foot-receiving surfaces is slightly recessed as indicated at 75. The two recessed surfaces lie normally in the same plane and are wide enough to receive the operator's foot for simultaneous operation of the pedals. The shoulders 76 at the outer ends of the recessed portions serve as guides to retain the operator's foot in proper position. These shoulders, however, are not high enough to appreciably interfere with the independent actuation of either pedal. With this embodiment, the foot-receiving surfaces can be either knurled or smooth, as desired.

As indicated in Figure 1, the two brake pedals 52, 53 are operated by the right foot of the operator, either simultaneously or independently, leaving the operator's left foot free to operate tte clutch pedal 80 on the opposite side of the tractor. The clutch pedal 80 is of any conventional construction, preferably somewhat similar to the brake pedal 52, and includes a pedal bar 81 extending laterally from the pedal shank 82, which is fixed at its lower end to a hub 83 and journaled on a supporting pin 84, which is carried beneath the tractor frame member 6 in a manner similar to that in which the brake pedals are supported. The clutch pedal is connected through a suitable actuating rod 85 with the tractor clutch mechanism.

We claim:

1. In a tractor having laterally spaced drive wheels and a pair of brakes associated therewith, a separate brake pedal for each of said brakes, said brake pedals being disposed at one side of the operator's station on the tractor and having pedal faces disposed closely adjacent one another to provide for their simultaneous or separate operation by the operator's foot at the option of the operator, said pedals having shanks extending downwardly generally perpendicular to said pedal faces and disposed flush with the adjacent ends of said pedal faces, respectively, and coextensive with a major portion of said ends to prevent the operator's foot from catching under the other pedal when one of said pedals is operated separately.

2. Control means for a pair of brakes providing for independent and simultaneous operation thereof, comprising a pair of pedals disposed side by side and having foot-receiving surfaces disposed closely adjacent and normally in substantially the same plane, said pedals including inner guard faces extending from and coextensive with a major portion of the inner edges of said foot-receiving surfaces in the direction of movement of said pedals a sufficient distance to prevent the operator's foot from being caught between the pedals when depressing one of the latter independently.

3. Control means for a pair of brakes providing for independent and simultaneous operation thereof, comprising a pair of pedals disposed side by side and having foot-receiving surfaces disposed closely adjacent and normally in substantially the same plane, said surfaces having substantially flush adjacent edges and raised guides at the outer edges to facilitate simultaneous operation of both pedals by one foot, and said pedals including inner guard faces flush with the adjacent inner edges of said surfaces coextensive with a major portion of said edges and depending therefrom a sufficient distance to serve as foot guides during independent operation of the opposite pedal, respectively, and as guards to eliminate any projection under which the foot could be caught.

4. A pair of cooperative foot control pedals adapted for both independent and simultaneous operation, comprising a pair of shanks coaxially supported at one end thereof for swinging movement and a pair of foot-receiving surfaces normally disposed substantially in a common plane and closely adjacent one another to facilitate simultaneous operation by one foot, said shanks having outer end portions flush with the adjacent inner edges of said surfaces, respectively, coextensive with a major portion of said edges and disposed substantially perpendicular to said surfaces and closely adjacent each other to serve as guides for the operator's foot when operating the pedals independently to prevent his foot from being caught between the pedals.

5. Control means for a pair of brakes comprising a pair of cooperative foot control pedals adapted for both independent and simultaneous operation and including a pair of adjacent shanks and foot-receiving pedal surfaces extending laterally therefrom and having a raised guide lip on the outer edge thereof, said surfaces being sufficiently wide to receive the foot of an operator for independent actuation, the adjacent portions of said surfaces being slightly recessed to receive the operator's foot and retain it in a substantially central position against lateral sliding to facilitate simultaneous operation, said pedals including inner guard faces flush with the adjacent inner edges of said surfaces coextensive with a major portion of said edges and depending therefrom a sufficient distance to serve as foot guides during independent operation of the opposite pedal and as guards to prevent catching the foot under the latter.

6. Control means for a pair of brakes comprising a pair of cooperative foot control pedals adapted for both independent and simultaneous operation and including a pair of adjacent shanks and foot-receiving pedal surfaces extending laterally therefrom and having a raised guide lip on the outer edge thereof, said surfaces being sufficiently wide to receive the foot of an operator for independent actuation, the adjacent portions of said surfaces being slightly recessed to receive the operator's foot and retain it in a substantially central position against lateral sliding to facilitate simultaneous operation, said shanks having outer end portions flush with the adjacent inner edges of said surfaces, respectively, coextensive with a major portion of said edges and extending a sufficient distance in the direction of movement of the pedals to serve as guides for the operator's foot when operating the pedals independently.

MAX SKLOVSKY.
WILLARD H. NORDENSON.